United States Patent [19]

Shores et al.

[11] Patent Number: 4,860,014
[45] Date of Patent: Aug. 22, 1989

[54] DOPPLER RADAR WITH MULTIPHASE MODULATION OF TRANSMITTED AND REFLECTED SIGNAL

[75] Inventors: Paul W. Shores, Houston; John W. Griffin, Pearland; Herbert S. Kobayashi, Webster, all of Tex.

[73] Assignee: The United State of America as represented by the Administrator of the National Aeronautics and Space Administration, Washington, D.C.

[21] Appl. No.: 125,677

[22] Filed: Nov. 25, 1987

[51] Int. Cl.⁴ .............................................. G01S 13/58
[52] U.S. Cl. ................................... 342/105; 342/114; 342/195
[58] Field of Search ............... 342/104, 105, 107, 108, 342/113, 114, 200, 201, 94–99, 109, 110, 115, 127, 130, 133, 135, 136, 139, 146, 162, 195

[56] References Cited

U.S. PATENT DOCUMENTS

| | | | |
|---|---|---|---|
| 3,422,430 | 1/1969 | Rittenbach | 343/9 |
| 3,611,370 | 10/1971 | Frasure et al. | 343/7.5 |
| 3,634,860 | 1/1972 | Rittenbach | 343/9 |
| 3,713,154 | 1/1973 | Kummer | 342/107 |
| 3,731,311 | 5/1973 | Williams | 342/201 |
| 3,742,501 | 6/1973 | Urkowitz et al. | 343/7.7 |
| 3,885,240 | 5/1975 | Jensen | 342/110 X |
| 3,935,572 | 1/1976 | Broniwitz et al. | 342/95 X |
| 4,008,474 | 2/1977 | Rittenbach | 343/7.7 |
| 4,011,564 | 3/1977 | Gulick, Jr. | 342/99 |
| 4,035,797 | 7/1977 | Nagy | 342/104 |
| 4,042,925 | 8/1977 | Albanese et al. | 342/162 X |
| 4,063,239 | 12/1977 | Johnson | 342/105 X |
| 4,153,900 | 5/1979 | Novak et al. | 342/201 |
| 4,176,352 | 11/1979 | Tyler | 343/9 R |
| 4,241,347 | 12/1980 | Albanese et al. | 342/89 |
| 4,439,766 | 3/1984 | Kobayashi et al. | 342/104 |
| 4,499,467 | 2/1985 | Rittenbach | 343/9 R |
| 4,709,237 | 11/1987 | Poullain et al. | 342/203 |

Primary Examiner—Thomas H. Tarcza
Assistant Examiner—Bernarr Earl Gregory
Attorney, Agent, or Firm—Hardie R. Barr; John R. Manning; Edward K. Fein

[57] ABSTRACT

A microwave radar signal is generated (16) and split by a circular (20). A phase shifter (24) introduces a plurality of phase shifts into a first part of the split signal which is then transmitted (36) by antenna (34). A like plurality of phase shifts are introduced by the phase shifter into the return signal (40) from the target. The circulator delivers the phase shifted return signal and the leakage signal from the circulator to a mixer (44) which generates an i.f. signal output at the doppler frequency. The i.f. signal is amplified (461), filtered (54), counted (58) per unit of time and the result displayed (62) to provide indications of target sense and range rate. An oscillator (50) controls rate of phase shift in the transmitted and received signals and provides a time base for the counter. The phase shift magnitude increases may be continuous and linear or discrete functions of time.

20 Claims, 2 Drawing Sheets

DOPPLER RADAR WITH MULTIPHASE MODULATION OF TRANSMITTED AND REFLECTED SIGNAL

ORIGIN OF THE INVENTION

The invention described herein was made by employees of the U.S. Government and may be manufactured and used by or for the Government of the United States of America for governmental purposes without the payment of any royalties thereon or therefor.

Background of the Invention

1. Field of the Invention

This invention relates to doppler radar systems, and, more particularly, relates to such systems wherein indications of sense as well as relatively low range rates are desired.

2. Background Art

Numerous systems have previously been employed in the art for measuring radar target sense and velocity including doppler, continuous wave, and pulse radar techniques. In the familiar doppler or homodyne radar system, a sample of the transmitted signal, serving as a coherent reference, is mixed with the received signal reflected from the target which includes a doppler shift functionally related to relative motion between the target and the radar. The mixer output is at this doppler frequency and thus provides indications of the desired relative velocity between the target and radar.

Several disadvantages of this system were evident. For example it was not possible with this technique to determine whether the target was opening or closing on the system, i.e. sense of the detected relative velocity. In an attempt to overcome this, a second mixer with a reference signal in phase quadrature with the first mixer reference was employed. The second mixer's doppler output would be in phase quadrature with the first mixer but would lead or lag depending on the velocity sense.

While an indication of sense could thereby be provided, not only was such a system expensive but measurement at very low doppler frequencies (corresponding to low relative velocities) proved difficult. This was due in part to a well known phenomenon of 1/f noise wherein noise output of the homodyne mixer is inversely proportional to frequency. Accordingly, these low doppler frequencies were masked in very high detector noise levels thereby severely limiting effective operational performance to short ranges and very moderate minimum detectable target velocities.

In the other aforementioned technique of continuous wave radar, the transmitted radar signal is conventionally frequency modulated as, for example, with a triangular waveform, and a sample thereof is input to the mixer. As with the previously described technique, the transmitted signal is reflected from the target and received, delayed of course by the time required to traverse the distance to and from the target. This received signal will again be frequency shifted due to the doppler shift arising from the relative target-radar velocities.

However, unlike the prior system, the mixer output signal has an average frequency proportional to range. Moreover, sense is detectable. If the frequency offset arising from the round trip delay is larger than the doppler shift, the mixer output frequency during the positive sweep of the transmitter may be subtracted from the mixer output frequency during the negative sweep to provide the doppler frequency as well as the indication of the sense of the relative velocity.

Whereas this system appears to provide the desired sense indications, it too suffers from numerous defects. First, the modulation of the carrier must be very accurately maintained. This requires highly complex control circuitry to provide the necessary symmetrical transmitter modulation which is directly related to the accuracy and resolution of the doppler frequency measurements. Moreover, in this system, sense determinations may be range dependent, i.e. doppler sense can be ambiguous as a function of range.

With respect to the third mentioned technique of pulsed doppler radars, these systems require vastly more complex techniques, resulting in very complex and costly equipment or suffering from other disadvantages such as limited minimum operational range or the like.

A further discussion of the problems inherent in other such systems is provided in U.S. Patent No. 4,439,766, entitled "Doppler Radar Having Phase Modulation of Both Transmitted And Reflected Return Signals", issued Mar. 27, 1984 to Kobayashi et al, the disclosure including the mathematical description of the various signals herein described being herewith incorporated by reference. There is disclosed in the aforementioned patent a technique wherein rather than frequency modulating the carrier, both the transmitted and reflected return signals have periodically introduced therein a fixed phase shift of a single preselected magnitude. Whereas such a system alleviated many of the hereinbefore noted problems associated with 1/f noise, measuring at low dopplers, and range dependence, problems were still nevertheless exhibited for example in detecting sense.

SUMMARY OF THE INVENTION

The present invention relates to doppler radar systems wherein indications of sense and relatively low range rates are desired. A microwave signal is split into a first part and a second leakage path signal part. The first part of the signal is then delivered to a phase shifter wherein phase shifts are introduced. The phase shifted transmission signal is then directed toward a target by means of a conventional radar antenna and the return or reflected signal from the target thence received at the antenna.

In like manner to the transmitted signal, the phase shifter then introduces phase shifts into the return signal prior to delivering it to the circulator. The circulator delivers this phase shifted return signal and the second or leakage path signal to a mixer which, in a conventional manner, forms an i.f. signal corresponding to the doppler signal. This i.f. doppler is amplified, filtered, and the output counted as a function of time to provide sense and range rate.

It is a particular feature of the invention to provide for a plurality of phase shifts both in the transmit and the receive path signals. More particularly, in a preferred embodiment, an oscillator operating nominally at 10 KHz drives the rate of phase shifting. The phase shifter may take the form of a linear phase shifter wherein phase varies over time as a ramp function from 0 to 180 degrees, the rate of which is controlled by the aforementioned oscillator.

In an alternate embodiment, a discrete phase shifter may be substituted for the linear phase shifter wherein phase shifts of discrete increasing or decreasing magnitudes are sequentially introduced into the transmitted and received radar signals between the circulator and the antenna. In the latter embodiment, gradually increasing phase shifts in increments of 45 degrees may be introduced from 0, 45, 90, 135, to 180 degrees afterwhich the phase shift introducing cycle is repeated. Again, as with a linear phase shifter, the rate of phase shift introduction may desirably be controlled by the oscillator rate.

A timer means is provided for generating a time base signal from the oscillator which is delivered to the counter. In this manner, the counter output will be the number of pulses from the band pass filter output per unit of time determined by the oscillator. In other words, the counter output will correspond to the number of counts from the filter output functionally related to the period of the oscillator which drives the phase shifter. A visual display of the counter is provided for the desired indications of sense and range rate. It will be appreciated that the center frequency of the i.f signal due to the oscillator driving the phase shifter will be the frequency of the oscillator itself which, in a preferred embodiment, is 10 KHz. Accordingly, in a preferred practice, the bandpass filter is centered about this i.f. frequency. In this manner, traversal of the target through 0 range rate will permit 0 range rate tracking, including i.f. amplification and filtering at the 10 KHz frequency.

DETAILED DESCRIPTION OF THE PREFERRED EMBODIMENT

Figure 1:
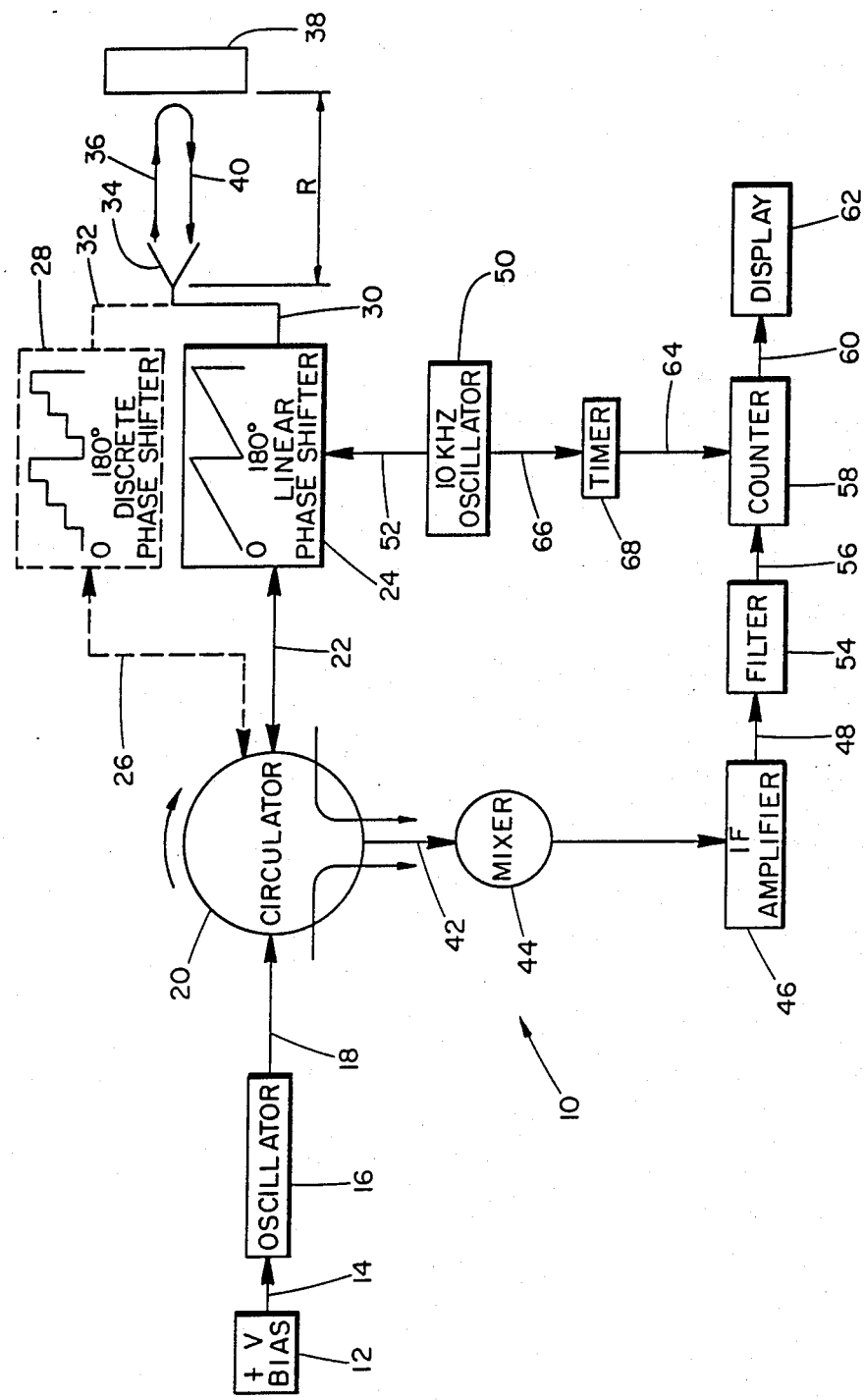
FIG. 1 is a functional block diagram of the doppler radar system in accordance with the present invention.
Figure 2:
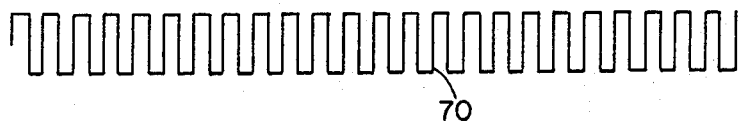
FIG. 2 is a typical waveform of the clock signal generated by the oscillator depicted in FIG. 1.
Figure 3:
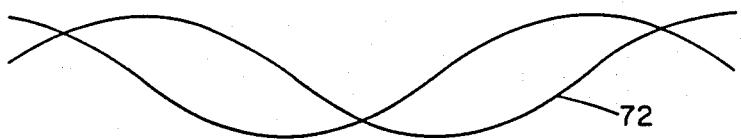
FIG. 3 is a representative simulated doppler signal.
Figure 4:
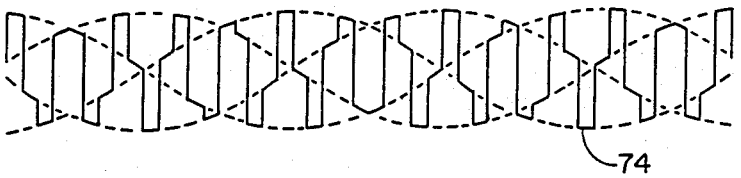
FIG. 4 is one cycle of a representative doppler signal waveform out of the mixer of FIG. 1 having a positive doppler velocity product by 11 cycles of i.f. signal.
Figure 5:
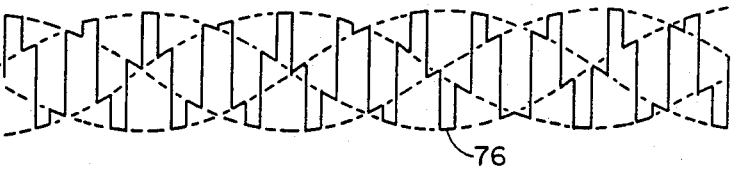
FIG. 5 is one cycle of a representative doppler signal waveform out of the mixer of FIG. 1 having a negative doppler velocity product by 9 cycles of i.f. signal.
Figure 6:
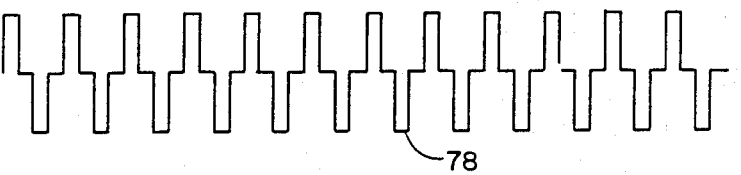
FIG. 6 is a typical i.f. signal of the system of FIG. 1 for 0 velocity at a given range by 10 cycles of i.f. signal.
Figure 7:
FIG. 7 is a doppler simulated 0 velocity function at a given range plus one-eighth of a wavelength.
Figure 8:
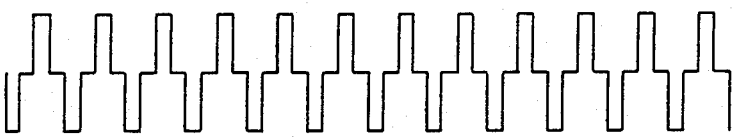
FIG. 8 is an i.f. signal for 0 velocity at a given range plus one-eight of a wavelength by 10 cycles of i.f. signal.
Figure 9:
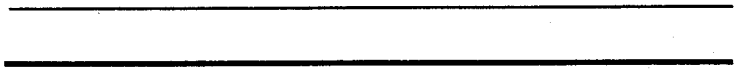
FIG. 9 is a doppler simulated 0 velocity function at a given range plus one-sixteenth of a wavelength.
Figure 10:
FIG. 10 is an i.f. signal of the system of FIG. 1 for 0 velocity at a given range plus one-sixteenth of a wavelength by 10 cycles of i.f. signal.

The invention may be embodied as depicted generally in FIG. 1, which is a functional block diagram of a general system 10 constructed in accordance with the teachings of the present invention. A source of d.c. 12 provides a d.c. bias voltage 14 for biasing a conventional microwave local oscillator 16. This oscillator may take the form of a Gunn diode which will generate a microwave signal 18 which, in a typical embodiment, may be nominally on the order of 10 GHz or the like in frequency.

A circulator 20, which also is of conventional construction such as a ferrite circulator or the like, is provided having three ports. The first or input port is for receiving the aforementioned microwave signal 18. An input-output port is provided which serves two functions. First, it outputs a first portion of the microwave signal 18 on line 22 or 26. Secondly, it will receive a return microwave signal on line 22 or 26 to be hereinafter described which is multiphase modulated in accordance with the present invention in a manner to be hereinafter described in greater detail.

A third port which is an output port is provided on the circulator 20. In conventional operation, the circulator will divide the incoming signal 18 into the first portion of the microwave signal which exits the input-output port and a second portion of the signal commonly referred to as a leakage signal component. The circulator 20 will provide at the third or output port a signal 42 which is the sum of the leakage path signal portion of the microwave signal 18 to the input port and the return signal 22 entering the input-output port of the circulator 20.

Still referring to FIG. 1, it will be noted that the input-output port of the circulator 20 is interconnected by means of line 22 or 26 to a linear phase shifter 24 or discrete phase shifter 28, respectively. Similarly, the phase shifter 24 or 28 is also connected by means of line 30 or 32 to a conventional microwave transmit-receive antenna 34. The purpose of the phase shifters 24 or 28 will be hereinafter discussed in greater detail. The microwave signal from the input-output port of the circulator 20, after traveling through the respective phase shifter 24 or 28 and being delivered by line 30 or 32 to the antenna 34 will thence be transmitted by the antenna 34 so as to traverse range R between the antenna 34 and a target 38 of interest. The transmitted radar signal 36 will impinge upon the target 38 which will accordingly generate a reflected return signal 40 which may be received by the antenna 34. This return signal 40 will then be transmitted by means of line 30 or 32 through the corresponding phase shifter 24 or 28 and thence on line 22 or 26, respectively, to the aforementioned input-output port of the circulator 20.

Part of the function of the circulator 20 is to combine a portion of the microwave signal 18, i.e. the leakage path signal, with the return microwave signal on line 22 or 26, and to deliver the resultant sum signal 42 to an appropriate diode mixer 44. The purpose of the mixer 44 is to form, in a conventional manner, a product of the leakage path signal and the return signal which will accordingly also have as a component the familiar doppler frequency which is functionally related to the relative velocity between the antenna 34 and the target 38. This product signal output from the mixer 44 is thence delivered to an appropriate i.f. amplifier 46.

For present purposes, it will be noted that the i.f. amplifier 46 is one which efficiently amplifies signals operating at a frequency of the oscillator 50 whose purpose will hereinafter be described in greater detail. The output signal 48 of the amplifier 46 is thence delivered to a suitable bandpass filter 54 which has a center frequency centered about the frequency of the i.f. signal corresponding to the frequency of the oscillator 50.

The purpose of this filter 54 is conventional in filtering out signals outside the band of frequencies at the i.f. center frequency plus or minus the doppler frequency, thereby eliminating the aforementioned 1/f noise problem as well as the problem of amplifying information signals such as a doppler approaching 0 frequency corresponding to 0 range rates.

The filter 54 may be implemented in any number of fashions well known in the art. Accordingly, in one embodiment, the filter 54 could take the form of a phase lock loop tracking filter which typically exhibits superior signal to noise ratio performance. The output 56 of the filter 54 is thence delivered to an appropriate counter 58.

An oscillator 50, operating at a preselected nominal frequency such as 10 KHz or the like, delivers an output 66 to a timer 68. The timer 68 thereby generates a time base signal 64 functionally related to the period of the oscillator 50, and delivers this time base signal 64 to the counter 58. The counter will then generate an output count 60 functionally related to the time rate of occurrence of pulses on the output of the filter 54 in functional relation to the period of the oscillator 50. In other words, the output 60 of the counter, inasmuch as it receives the i.f. output signal 56 and the time base signal 64, will be an indication of the doppler pulses out of the filter 54 occurring as a function of the time of the period of the oscillator 50. This counter output 60 is thence delivered to an appropriate visual display 62 which accordingly provides a visual indication of the sense and range rate of the target signal.

The introduction of a plurality of multiphase shifts in both the transmit and receive path of the microwave signal, which is a unique feature of the present invention, will now be described in greater detail. In one form of the present invention the phase shifter 24 will preferably be a linear phase shifter. A gradually increasing amount of phase shift will thus be introduced into the transmit and receive signals flowing therethrough until a maximum of 180 degrees of phase shift is introduced, whereupon the process will resume again to gradually and continuously introduce phase shift from 0 to 180 degrees. The rate at which this gradually increasing phase shift is introduced into the transmit and receive signals will be controlled by the frequency output 52 of the oscillator 50. Accordingly, it is a feature of the invention to provide for multiphase modulation in the path of both the transmitted and reflected return signal.

In an alternate embodiment, a discrete phase shifter 28 is provided which may be implemented by a discrete digital filter or the like. In like manner to the phase shifter 24, a gradually increasing amount of phase shift is introduced into both the transmitted and reflected return signal, with the rate of such increase again being controlled by the oscillator frequency 50. However, unlike the linear phase shifter 24, with reference to FIG. 1 it is apparent that the magnitude of phase shift introduced by the discrete phase shifter 28 will preferably occur in increments rather than continuously, i.e. in one embodiment discrete incremental phase shifts will be introduced into the receiving and transmit signals of 45 degrees in each increment, whereby sequentially a phase shift of 0, 45, 90, 135, and 180 degrees will be introduced, whereupon the cycle will repeat at the rate determined by the oscillator 50.

It will be noted from FIG. 1 that this same rate provided by the oscillator 50 which controls the rate of phase shift also determines the period through which doppler pulses from the bandpass filter will be counted inasmuch as the timer 68 delivers on line 64 to the counter 58 time base signals functionally related to the period of oscillator 50. The output 60 of the counter will be the doppler count or range without such time base correction, however the range rate may also be displayed by taking the time derivative of this doppler count.

Relative timing of the hereinbefore noted various signals may be seen with reference to FIGS. 2-10 wherein reference numerals 70 and 72 indicate occurrence of 20 clock cycles and numerals 74-78 indicate occurrence of 11, 9, and 10 cycles of i.f. for one representative doppler cycle, respectively. In cases in which the maximum expected doppler frequency is much smaller than the frequency of the oscillator 50 or the period of the oscillator 50 is much greater than the roundtrip R delay time between the antenna 34 and target 38, from the foregoing it will be apparent that a useful doppler component will thereby be introduced into the received signal due to relative motion between the target 38 and the antenna 34.

The alternating doppler is translated to an i.f. signal which may be filtered and demodulated at a high level. Accordingly, noise and d.c. components are readily filtered out whereby the remaining doppler signal about the center 10 KHz i.f. signal may be easily amplified and displayed for range rate values through 0. With the present system, indications of sense are provided in that target movements in one direction will provide i.f. signals slightly on one side of the center frequency, whereas movement in the opposite direction will provide an i.f. frequency component slightly on the other side of the center frequency.

As to selection of the relative frequencies of the oscillators 16 and 50, the rate of multiphase shifting is functionally related to the range of the doppler. Accordingly, the oscillator frequency 50 should be selected so as not to be relatively close to the expected doppler frequency inasmuch as this would result in a situation similar to the prior art wherein difficulties were experienced in attempting to amplify and filter through a 0 doppler frequency.

While a single embodiment of the invention has been described, variations thereof can be made without departing from the teachings of the invention. Therefore, it is intended that the scope of the invention be limited only by the claims which follow.

I claim:

1. A doppler radar system for measuring range rate and sense, comprising:
    first oscillator means for generating a microwave signal;
    circulator means having an input port for receiving said microwave signal, an input-output port for outputting a first portion of said microwave signal and for receiving a phase modulated return microwave signal, and an output port for outputting an unmodulated second portion of said microwave signal and said phase modulated return microwave signal;
    antenna means for transmitting a transmitted microwave signal and receiving a return microwave signal;
    phase shifting means for receiving said first portion of said microwave signal, phase modulating said first portion of said signal with a first plurality of phase shifts characterized by a phase shift rate, and outputting said phase modulated first portion of said signal to said antenna means as said transmitted signal, and also for receiving said return signal, further phase modulating said return signal with a second plurality of phase shifts also characterized by a phase shift rate to generate said phase modulated return signal, and outputting said phase modulated return signal to said input-output port of said circulator;

mixer means for mixing said unmodulated second portion of said signal and said phase modulated return signal to form an i.f. signal functionally related to said range rate and sense;

amplifier means for providing an amplified output of said i.f. signal;

filter means for filtering said amplified i.f. signal to generate a filtered i.f. output signal; and second oscillator means generating an oscillator output for controlling said first and said second phase shift rates, whereby said first and said second phase shift rates are related to the range rate and thus to the frequency of the i.f. signal, and whereby the relative frequency of said second oscillator means with respect to said frequency of said i.f. signal is controllable.

2. The doppler radar system of claim 1 further comprising timing means for generating a time base signal functionally relating the period of said second oscillator to the filtered i.f. output signal.

3. The doppler radar system of claim 2 wherein said timing means comprises
timer means interconnected with said second oscillator means for generating a time base signal functionally related to said second oscillator period; and
counter means for receiving said filtered i.f. output signal and said time base signal and generating as a counter output, a count of the filtered i.f. signal as a function of said time base signal.

4. The doppler radar system of claim 3 including
display means for generating a visual display of said counter output as an indication of said range rate and sense.

5. The doppler radar system of claim 1 wherein the phase shift rates of said first and said second plurality of phase shifts are equal.

6. The doppler radar system of claim 5 wherein the phase shift rate of said first and said second plurality of phase shifts varies cyclically over time from 0–180 degrees.

7. The doppler radar system of claim 6 wherein the phase shift rate of said first and said second plurality of phase shifts varies as a linear ramp function.

8. The doppler radar system of claim 6 wherein the phase shift rate of said first and said second plurality of phase shifts varies in discrete, selectively increasing or decreasing, increments.

9. The doppler radar system of claim 8 wherein said discrete phase shifts are 45, 90, 135, and 180 degrees.

10. The doppler radar system of claim 1 wherein the frequency of said second oscillator means is substantially less than the frequency of said i.f. signal.

11. The doppler radar system of claim 1 wherein the frequency of said second oscillator means is substantially greater than the frequency of said i.f. signal.

12. A doppler radar method for measuring target range rate and sense, comprising:
generating a microwave signal;
splitting said microwave signal into a first and a second portion;
phase modulating said first portion of said microwave signal with a first plurality of phase shifts having a phase shift rate;
transmitting said phase modulated first portion of said microwave signal to a target;
receiving a portion of said phase modulated transmitted signal
further phase modulating said received portion of said transmitted signal with a second plurality of phase shifts having a phase shift rate;
mixing said unmodulated second portion of said microwave signal with said further phase modulated received portion of said transmitted signal to form an i.f. signal;
amplifying said i.f. signal;
filtering said amplified i.f. signal to generate a filtered i.f. output signal having an i.f. frequency which is functionally related to the range rate of the target; and
generating an oscillator output at an oscillator output frequency for controlling rate of said first and said second plurality of phase shifts in accordance with said i.f. frequency.

13. The method of claim 12 further including the steps of
generating a time base signal functionally related to said oscillator output frequency;
counting the number of cycles in said filtered i.f. output signal as a function of said time base signal; and
generating a counted output in functional response to said counting.

14. The method of claim 13 further including the step of displaying said counted output as an indication of said range rate and sense.

15. The method of claim 12 wherein said phase shift rate of said first and said second plurality of phase shifts are equal.

16. The method of claim 15 wherein said phase shift rate of said first and said second plurality of phase shifts varies cyclically over time from 0–180 degrees.

17. The method of claim 16 wherein said phase shift rate of said first and said second plurality of phase shifts varies as a linear ramp function.

18. The method of claim 16 wherein said phase shift rate of said first and said second plurality of phase shifts varies in discrete, selectively increasing or decreasing, increments.

19. The method of claim 18 wherein said discrete phase shifts are 45, 90, 135, and 180 degrees.

20. A doppler radar method for measuring target range rate and sense, comprising:
generating a microwave signal,
separating said microwave signal into a first portion to be multiphase modulated and a second portion to remain unmodulated,
multiphase modulating said first portion of said microwave signal,
transmitting said multiphase modulated signal to a target,
receiving a portion of said transmitted signal reflected from said target,
further multiphase modulating said received signal,
mixing said further multiphase modulated received signal and said unmodulated second portion of said microwave signal to form an i.f. signal functionally related to said target range rate and sense.

* * * * *